April 11, 1944.    R. ANDERSON    2,346,346
FRACTURE IMMOBILIZATION SPLINT
Filed Jan. 21, 1941    5 Sheets-Sheet 1

INVENTOR
ROGER ANDERSON
BY
Cook & Robinson
ATTORNEY

Patented Apr. 11, 1944

2,346,346

UNITED STATES PATENT OFFICE 2,346,346

FRACTURE IMMOBILIZATION SPLINT

Roger Anderson, Seattle, Wash.

Application January 21, 1941, Serial No. 375,278

4 Claims. (Cl. 128—92)

This invention relates to fracture immobilization splints, and more particularly to splints employing skeletal transfixions in the securement of the fracture fragments in apposition; it being the principal object of the present invention to provide splints of the above character whereby fractures of the bones of the arms and legs of the human body, in particular, may be immobilized and the fracture fragments held in correct apposition without the use of limb encasing plaster casts as are generally applied, and without requiring the wrapping or encasement of the injured limb in any way or by any means that would interfere with a ready and easy treatment of flesh wounds that might be incident to the injury.

It is also an object of this invention to provide a fracture immobilization splint using bone transfixions mounted by devices in the form of yokes or bars, that can be employed with means for the mechanical manipulation, reduction and holding of the fracture and which yokes or bars are equipped also for the reception of a rigid connector whereby they may be joined for the immobilization of the fracture fragments relative to each other.

It is a further object to provide fracture immobilization splints which, by reason of their use, reduce the time the patient is required to be anesthetized; reduces the time in the surgeon's room, and the doctor's time for setting the fracture. Furthermore, which eliminates the usual wet cast shock to the patient, avoids the muss of plaster and plaster bandages, and is advantageous to the patient by making possible joint exercise possible. It promotes cleanliness, avoids pressure sores and itching, and makes possible an easy readjustment of bone fragments if necessary, and due to its weight and mode of application, makes ambulation immediately possible with the patient fully dressed. The difficulties that result from shrinkage or atrophy are avoided.

It is also an object of the invention to provide for the secure holding of a fracture fragment by the novel application of dual, non-parallel transfixion pins, half pins or wires therethrough.

Still another object of the invention is to be found in the novel use with the present immobilization yokes and bars, mounting the bone transfixion pins or wires, of swivel devices of special and novel construction that may be applied to the yokes or bars in various ways to best suit the particular case of their use and which are adapted to adjustably receive the rigid connector bar; these swival devices providing for the universal adjustment of the transfixion mountings relative to each other for bringing the fracture fragments into proper apposition and then for holding them in set position during the period of healing of the fracture.

Still further objects of the present invention reside in the various details of construction of parts and in their combination and mode of use as will hereinafter be fully described.

In accomplishing these and other objects of the invention, I have provided the improved details of construction, the preferred forms of which are illustrated in the accompanying drawings, wherein—

Referring more in detail to the drawings—

It is intended that the present type of splint be provided for use where it is impossible or impractical to employ limb encasing bandages or casts. For example, in warfare, it frequently happens that a limb is struck by a rifle bullet, bomb fragment or by shrapnel in a manner that leaves the bone fractured and the flesh so torn and wounded that it is dangerous or at least undesirable to cover the wound, and it is most desirable that it be left uncovered for fluoroscopic or X-ray examination and treatment. Also, on battle fronts, where it is impractical or impossible to take the time to completely finish the reducing and treating of a fracture, it is of great advantage, and lessens the pain experienced by the wounded person, if the fracture can be reduced or partly reduced and the fragments painlessly immobilized as a temporary measure until the patient can be transferred to a base hospital and the reduction completed.

The present invention, therefore, has as its main object to provide a splint that is especially advantageous in cases of the above kind, and furthermore, a splint that may be provided in various modifications in order that the different kinds of fractures and the different locations in which fractures may occur in the arms or legs of the human body, may readily be accommodated.

The invention comprises, in each of its various modifications, mountings in the nature of yokes or bars, for bone transfixion pins or wires, and a rod, or bar for the rigid connection of the complemental mountings for the transfixion at opposite sides of the fracture, together with the swivel clamp devices which provide for that necessary relative adjustment of parts for bringing the fracture fragments properly into apposition, and then makes possible the rigid securement of the mountings relative to each other to maintain the fracture immobilized.

The various modifications of the present splint, while basically alike, differ only in those respects required to accommodate the particular location of the fracture or the different kinds of transfixions necessary for the particular fracture.

Figures 1, 2:
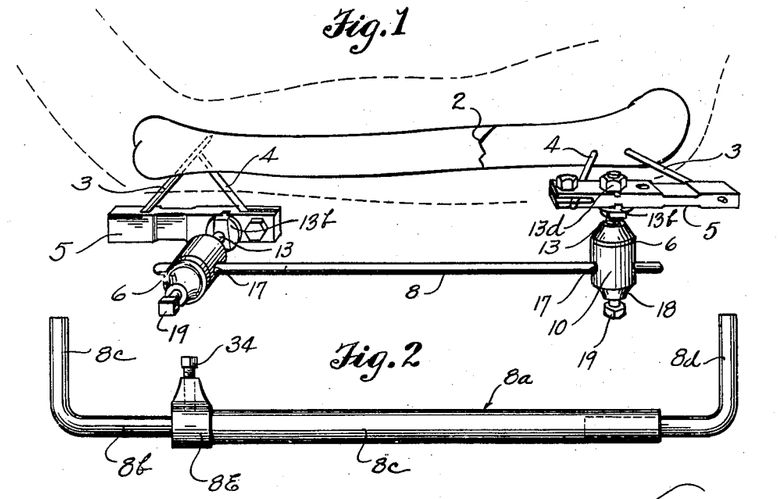
Fig. 1 is a perspective view illustrating the present form of splint in one of its modifications, and as applied to a fractured humerus.
Fig. 2 is a side view of one form of adjustable bar designed for use as a rigid connector for the complemental transfixion mounting bars or yokes employed in splints of the present kind.

Referring first to Fig. 1: In this view I have illustrated use of the present splint for the immobilization of a fracture occurring in the humerus of the left arm; the arm being indicated in dotted lines and the fracture being indicated at 2. Applied to each of the two fragments of the fractured bone, in non-parallel relation and preferably in angular convergence, are transfixation pins 3 and 4. As here shown, the pairs of half pins are applied near the joint ends of the bone fragments for better holding effect, and safer anatomical approach. The pins in each fragment are fixedly mounted at their outer ends in metal bars 5, with their inner end portions projecting slightly through the bone as has been more fully described in U. S. Patent No. 2,308,802, issued to me on May 18, 1937. The bars 5 used in the splint of Fig. 1 may be alike in construction but for convenience or more practical use, are reversed in position. Rigidly mounted on each bar is a swivel clamp device of the present invention, generally designated by numeral 6, and later described in detail. The swivel clamp devices 6 of the complemental bars 5 as used in this splint, are rigidly joined together through the mediacy of a connector rod, or bar, 8 to immobilize the fracture, and retain the fracture fragments in correct relationship for healing.

Figure 4:
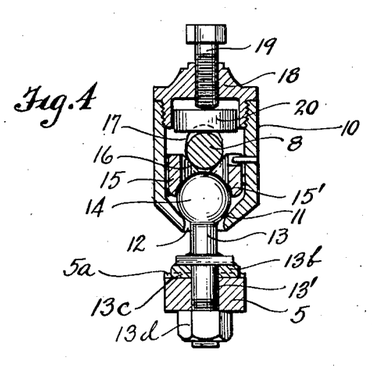
Fig. 4 is a cross sectional view of one of the swivel clamps employed in splints of the present kind.
Figure 5:
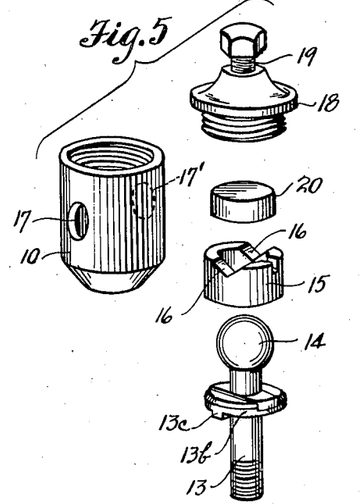
Fig. 5 is a view showing in perspective, the various parts of the swivel clamp in disassembled relationship.

The swivel clamp device 6, in the preferred form of construction, as illustrated best in Fig. 4, comprises a cylindrical barrel 10 tapered at one end in a manner to form an internal, conical seat 11 provided centrally with an opening 12. Extending from the barrel, through the opening 12 with a substantial amount of clearance, is a bolt shank 13 for mounting the swivel clamp. This shank is threaded at its outer end and is adapted for fixed mounting in a bar 5, as shown in Fig. 1, or on the various forms of yokes, later to be described.

At its inner end, the bolt shank 13 is formed with a ball 14 which seats against the conical seat 11. Slidably fitted in the barrel, above the ball, is a cylindrical sleeve 15 which has a spherically curved seat 15' at its lower end fitted to the top side of the ball 14, and at its upper end, has diametrically opposite V-shaped notches 16—16 formed therein.

In opposite side walls of the barrel 10 are oblong holes 17—17', through which the end portion of a connector rod, or bar 8 may be adjustably extended, and when so extended, the bar is adapted to rest in the V-shaped notches 16—16 of the sleeve 15, as noted in Fig. 4. Also, the openings 17—17', being lengthwise of the barrel, provide for a substantial amount of movement of the sleeve in the axial direction of the barrel without unseating the rod from the notches or engaging the rod against the ends of the holes 17—17'.

Threaded into the upper end of the barrel, is a cap 18, and mounted centrally therein is a set screw 19 adapted to be tightened against a bearing block 20 that is loosely contained in the barrel in a position flatly overlying and engaged against the top side of the end of the rod 8 when seated in the sleeve notches 16 and extended through the barrel.

The construction and assembly of parts of the swivel clamp is such that with the screw 19 loosened and the connector rod 8 extended loosely through the openings 17—17' of the barrel, the latter may be moved freely on the rod and the ball 14 will be free to pivot on the seat 11. However, by tightening the set screw 19 against the block 20, the latter will be clamped against the rod 8 and the rod, in turn, presses the sleeve 15 against the ball 14, and the ball against the conical seat 11, thus to rigidly clamp the parts against relative movement.

Assuming the parts of the splint to be so constructed, and to be assembled as illustrated in Fig. 1, with the swivel clamp devices 6 fixedly mounted respectively on the bars 5 at opposite ends of the splint, and the ends of the bar 8 loosely extended through the openings of the swivel clamp devices, it will be understood that the fracture fragments may be manipulated by or through the mediacy of the bars 5, which are secured thereto by the pins 3 and 4, and the fracture thus reduced. Then, with the fracture fragments in proper reduction or in a desired relationship, the swivel clamps may be set by tightening the screws 19, and all parts of the splint will be thereby rigidly locked for immobilization of the fracture.

Figure 3:
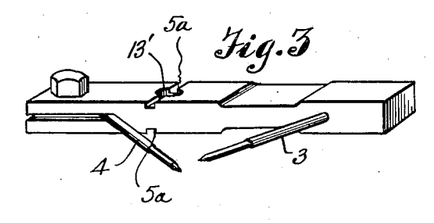
Fig. 3 is a perspective view of one of the present forms of bars for mounting transfixion pins for the securement of a fracture fragment.

A detail of construction of the present bar 5 is observed in Figs. 3 and 4, showing it to be equipped with an unthreaded hole 13' therethrough, adapted to receive the mounting shank 13 of a swivel clamp 6 and formed with transverse slots 5a, in both sides of the bar and passing centrally through the ends of the hole 13'.

It is to be noted also that the mounting shank 13 of each swivel clamp is provided, at a distance spaced somewhat from the ball, with a solid abutment shoulder 13b, and this, in the mounting of the clamp on the bar 5, flatly engages the face of the bar. The abutment shoulder 13b has a cross rib 13c on its under side adapted to seat in a cross slot 5a of the bar to hold the shank against rotation that otherwise might result from slight looseness of the shank in the bar. A nut 13d is applied to the threaded end of the shank and tightened against the bar 5 to rigidly mount the swivel clamp.

When the splint has been applied to the patient, should it be desired to make readjustments, it is only necessary to loosen the set screws 19, and this incidentally releases the clamping action of the swivels and permits relative movement of the bars 5 for any desired resetting or readjustment of the fracture fragments. When resetting is completed, the screws 19 are again tightened to render the fracture immobile.

Figures 6, 7, 8, 9, 10:
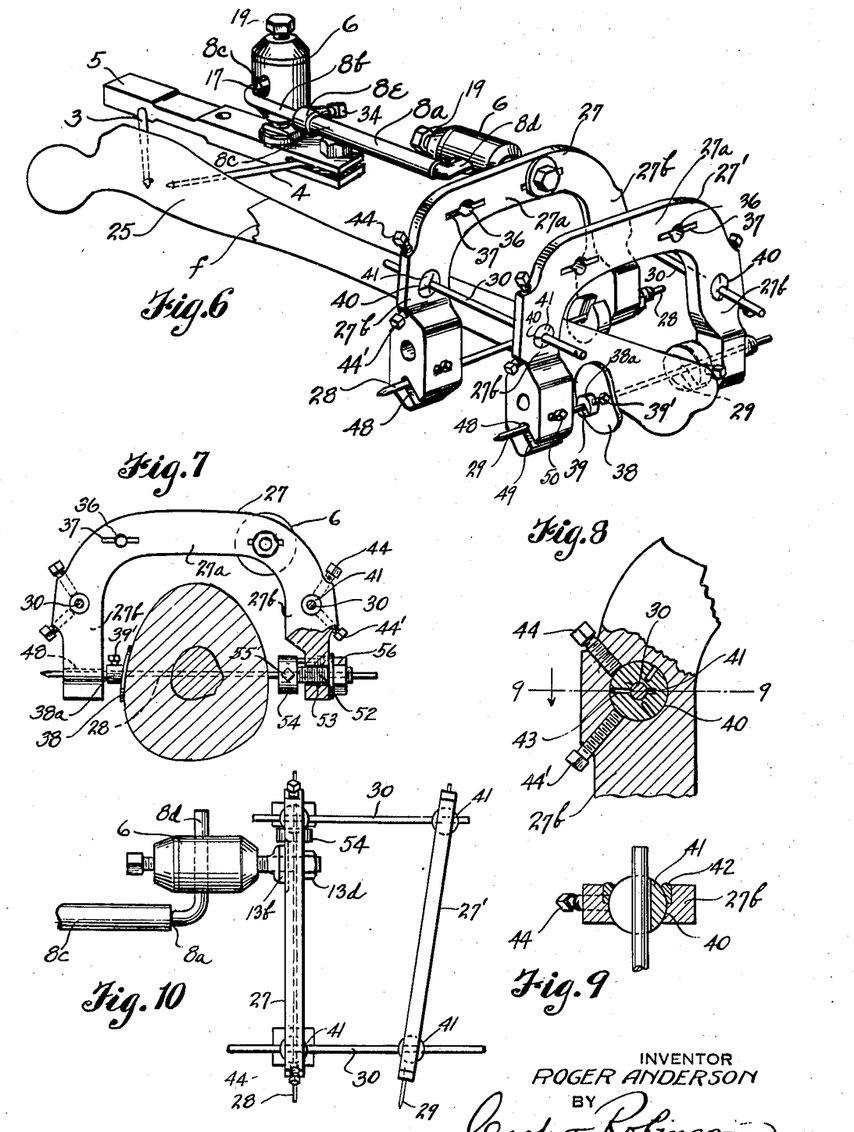
Fig. 6 is a perspective view illustrating one of the modifications of the present type of splint designed for application to the femur, and employing dual transfixions at the distal end.
Fig. 7 is a side view of one of the transfixion mounting yokes as applied to the limb; the latter being shown in cross section.
Fig. 8 is a detail of the spacer rod mounting ball as applied to the yoke arm for mounting the rod as used in the dual arrangement of transfixion members.
Fig. 9 is a horizontal section on the line 9—9 in Fig. 8.
Fig. 10 is a top, or plan view illustrating the non-parallel position of the transfixion mounting yokes as applied in dual relationship to the distal end of the fractured bone.

Now, referring to the modification or another alternative form of splint shown in Fig. 6: This form of splint is shown as used for fractures of the femur; the femur being designated by reference character 25 and the fracture therein is indicated at f. Transfixion pins 3 and 4 are applied in convergence to the superior fragment and are fixed at their outer ends in a rigid mounting bar 5 on which a swivel clamp device 6 is mounted; these parts 5 and 6, being in accordance with the bar and swivel clamp already described.

Applied across the limb at the distal end of the fractured bone, are two traction yokes, designated respectively by numerals 27 and 27' each yoke comprising a base portion 27a and substantially parallel legs 27b. A wire 28 transfixes the distal fragment, somewhat spaced from its joint end, and is held taut between the ends of the legs of the yoke 27, by means presently described, and a pin 29 likewise transfixes the bone fragment and is held secure by and extends between the legs of the yoke 27'. The pin and the wire transfix the bone fragment in non-parallel relationship, as noted best in Fig. 10, and the yokes which mount these parts are rigidly joined together by small, round spacing rods 30 that extend between the corresponding legs of the two yokes and are secured by means presently to be described in detail.

Mounted on the cross member or base portion 27a of the yoke 27, is a swivel clamp 6, and an adjustable connector bar 8a joins the swivel device 6 of the transfixion mounting bar 5 at the superior end of the bone with the swivel clamp 6 of the yoke assembly at the distal end, to provide for a rigid joining of the complemental parts of the splint for immobilization of the fracture. In Fig. 6, I have shown the connector bar as comprising an extension rod 8b that has a laterally turned outer end portion 8c applied through the barrel of the swivel clamp that is mounted on the bar 5. The inner end of rod 8b is straight and telescopes, and is also rotatable within a tubular extension 8c, which, at its outer end, is equipped with a laterally turned arm 8d that is applied through the barrel of the swivel clamp 6 that is mounted on yoke 27. The tubular member 8c is equipped with a collar 8e at one end which mounts a set screw 34 adapted to be tightened against the rod 8b to hold the telescoped parts at any adjusted relationship. This bar is best illustrated in Fig. 2.

In reducing a fracture utilizing the splint of Fig. 6, the transfixions are first applied to the bone fragments as illustrated. The pins 3 and 4 are fixedly secured in the bar 5 at one side of the fracture, and the yokes 27 and 27' are applied to the wires that transfix the other fragment and the transfixions secured. The couplings 30—30 are then applied and secured, and the connector bar finally adjusted for length and applied to the swivel clamps 6 on bar 5 and yoke 27, and while the clamp devices are in loosened condition, the fracture fragments are brought to proper relationship. Then, while the fragments are held in proper reduction, the swivel clamps are tightened, as is also the set screw 34 of the connecting bar. Thus, the complemental parts of the splint will be rigidly joined and the fracture immobilized.

While I have not herein illustrated any means for mechanical reduction of the fracture, it is to be understood that the reduction may be mechanically accomplished through the mediacy of the bar 5 and yoke 27 which are designed for connection with a mechanical reducing means, such, for example, as that illustrated in my U. S. Patent No. 2,185,322, of January 2, 1940.

In order to provide for mounting of the swivel clamp 6 at convenient positions, either on the yoke 27 or 27', each is provided in its base bar with one or more holes 36 therethrough, and there are also cross slots 37 formed in the faces of the bar, diametrically through the ends of the holes 36, to seat the rib 13c that is formed on the face of the mounting shank shoulder of the swivel device, to keep the swivel shank from rotating in the event of slight looseness. The particular hole 36 of yoke 27 in which the swivel clamp 6 is to be mounted, is dependent upon the location of the fracture or other circumstances of the particular case.

In the application of the wire or pin 29 and wire 28, there is no specified angle or relationship, but they should not be parallel; it being understood that when, in non-parallel relationship and held rigid, there can be no lateral slipping of the bone thereon. These transfixions are applied, then the yokes are applied to the transfixions, and finally the yokes are rigidly united to hold the yoke assembly and dual transfixions in rigid assembly.

In the event that but one transfixion should be used, such as the pin 29, or should it be found desirable, for any reason, to place the through transfixions in parallel relationship, then the limb may be held against lateral slippage between the yoke arms by the application of stop washers or disks to the transfixion adjacent opposite sides of the limb. Such a disk is designated at 38 in Figs. 6 and 7. It comprises a circular plate with hub portion 38a and a radial slot 39 that permits the disk to be applied to the transfixion or removed without dismounting the transfixion from the yoke arms. A set screw 39' is threaded into the hub to engage the pin to hold the disk in place. Preferably, this particular stop disk is made from a plastic material which becomes pliable when placed in hot water, and may then be shaped to conform to that portion of the patient's limb against which it engages, thus to eliminate possible soreness.

The fixed relationship of the yokes 27 and 27' is accomplished through the mediacy of the small rods 30. It is to be observed, by reference to Figs. 6 and 8, that the legs of each yoke device are equipped with sockets or openings 40 therethrough in which split ball bushings 41 are rotatably contained. Each ball bushing 41 is held rotatably in its socket or opening 40, as will be understood by reference to Figs. 8 and 9, between the base of the socket and an inserted ring 42. The ball bushing in each case is diametrically split approximately one-half through, as at 43, and is diametrically bored for slidably containing the rods 30 therein.

Threaded into the yoke legs and directed toward the ball bushings, are set screws 44 and 44' adapted to be tightened against the ball bushings 41 for two purposes: First, to hold the ball against rotation, and second, to compress the partly split ball and thus clamp the rod 30 therein against movement; this being possible due to the ball being split. Thus, it will be understood that after the transfixion wire 28 and the transfixion pin 29 have been applied through the bone fragment, and the ends thereof secured in the arms of their respective mounting yokes, the yokes may be rigidly joined by applying the end portions of the shafts 30 through the bearings 41 as illustrated in Fig. 6, then tightening the set screws 44—44' to clamp and hold the rods against any slippage. Thus, with the yokes rigidly united by the rods 30, and the swivel devices 6 on the bar and yoke 27 tightened on the connecting rod 8a, the whole assembly of parts will be rigidly joined and the fracture will be immobilized.

For application of the ends of wire 28 and pin 29 to the yoke arms, the latter are provided with alined openings 48 therethrough, and there are slots 49 leading to these openings. Also set screws 50 are applied to the arms for tightening against the seated wire or pin to hold them in place. The wire may be drawn taut and secured by any suitable tightening means; for example, as shown in Fig. 7, wherein one end of the wire is shown as applied to an exteriorly threaded sleeve 52 that slides through a hole 53 in the yoke arm. The sleeve is equipped with a collar 54 at one end, mounting a set screw 55 adapted to be tightened against the wire, and there is a nut 56 threaded on the outer end of the sleeve for tightening against the yoke arm to draw the wire tight. It is preferred to use the wire through the denser part of the bone in lieu of the larger pin.

Figure 11:
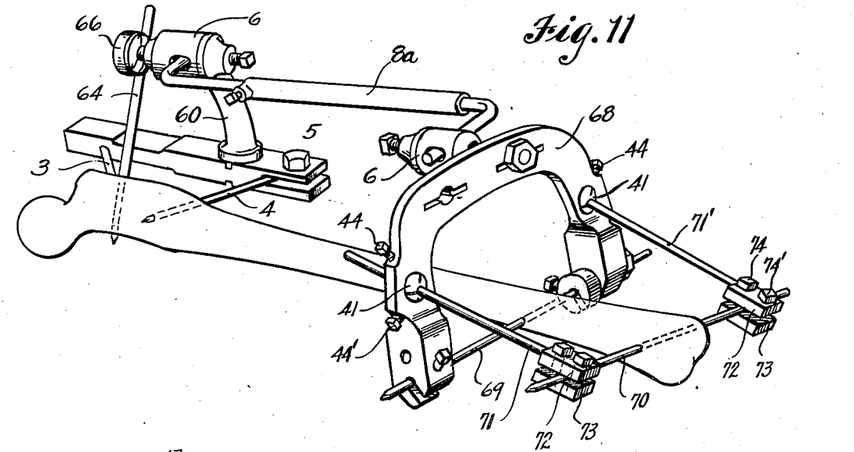
Fig. 11 is a perspective view, illustrating use of dual transfixions, one mounted by the yoke and the other by the use of special mountings.
Figure 12:
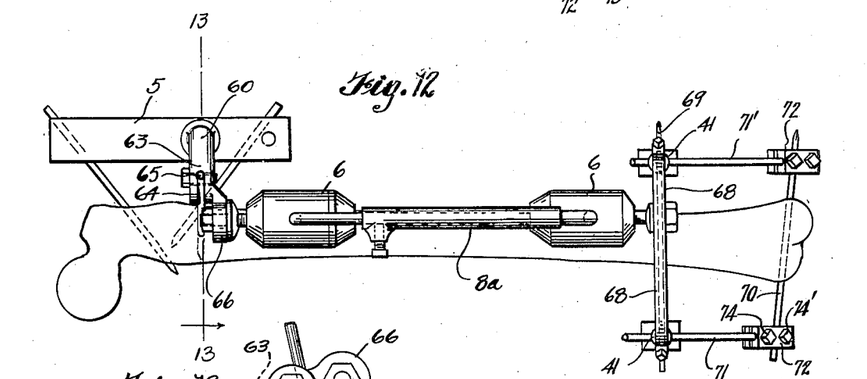
Fig. 12 is a top view of the parts as seen in Fig. 11.

In Fig. 11, I have illustrated still another alternative arrangement of parts, providing a splint adapted for fractures of the femur. In this splint, the bar 5 which mounts the transfixion pins 3 and 4 also mounts an upwardly directed and inwardly curved bracket 60. This is equipped with a threaded shank 61 for application through a hole 13' in the bar and for rigid securement by a nut 62. At its upper end, the bracket is split, as at 63, for mounting a bone transfixion pin 64 and is equipped with a tightening bolt 65 to clamp the pin in place. Also, there is an extension lug 66 at this upper end, with a hole 67 therethrough for mounting a swivel clamp 6, as shown in Fig. 12, for the mounting of a connector rod 8a.

At the distal end, there is a yoke 68 for mounting a traction wire 69, which would be secured in a manner as previously described, and there is a transfixion pin 70 supported from the yoke by a pair of arms 71—71'. These arms 71—71' comprise shafts that are applicable to the ball bushings 41 of the yoke arms, as were the shafts 30, previously described, and at their outer ends, these arms have clamps for securement to the ends of the pin therein.

Figures 13, 14:
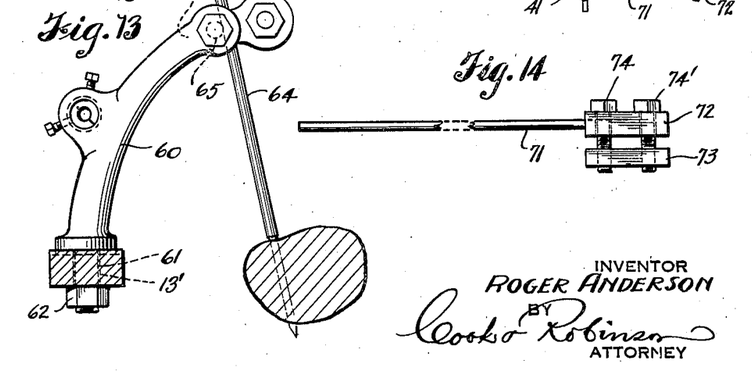
Fig. 13 is a cross section on line 13—13 in Fig. 12.
Fig. 14 is a side view of the transfixion mounting extension arm and clamp.

Each clamp comprises a head block 72 that is fixed to the rod, and a clamp block 73 mounted by bolts 74—74', as noted in Fig. 14. The ends of the pin are applied between the blocks 72 and 73, and are then held secure after an adjustment has been made, by tightening the bolts. Then, the set screws 44—44' of the yoke arms are tightened to hold the ball bushings against rotation, and this clamps and holds the arms and the pin rigid relative to the yoke. This yoke also mounts a swivel clamp 6, as described in connection with yoke 27.

In using this splint, the transfixions are first applied, and secured in their respective mounting members. Then the connecting bar 8 or 8a is applied to the swivel clamps 6 and when reduction of the fracture has been made, the swivel clamps are tightened to immobilize the fracture.

Figure 15:
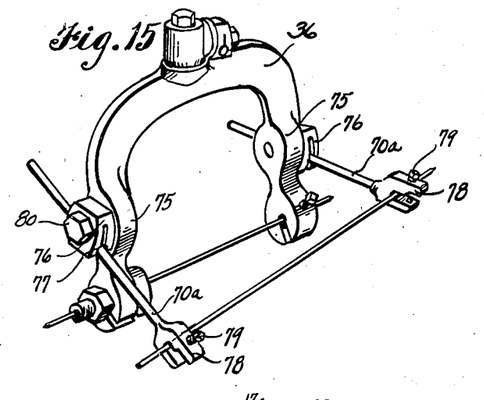
Fig. 15 is a perspective view illustrating an alternative form of yoke and extension arm and clamp.
Figure 16:
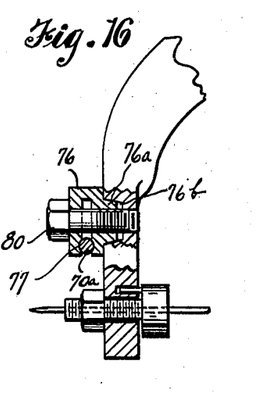
Fig. 16 is a sectional detail of the same.

As an alternative form of yoke for this latter described modification of splint, I may employ that of Fig. 15, wherein the yoke arms are shown as equipped with enlargements 75 for the mounting of split clamp blocks 76. The split blocks are bored, as at 77, to slidably receive the rod-like shanks 70a which, at their ends, carry the rod or pin mounting jaws 78 equipped with set screws 79 for holding the pin or rod therein. The clamp blocks are bored to receive mounting bolts 80 which may be tightened to both clamps, and to secure the arms in position. These blocks may advantageously be equipped with tapered bases, as at 76a, to seat in similarly tapered sockets 76b to insure against slippage.

Figures 17, 17A, 18:
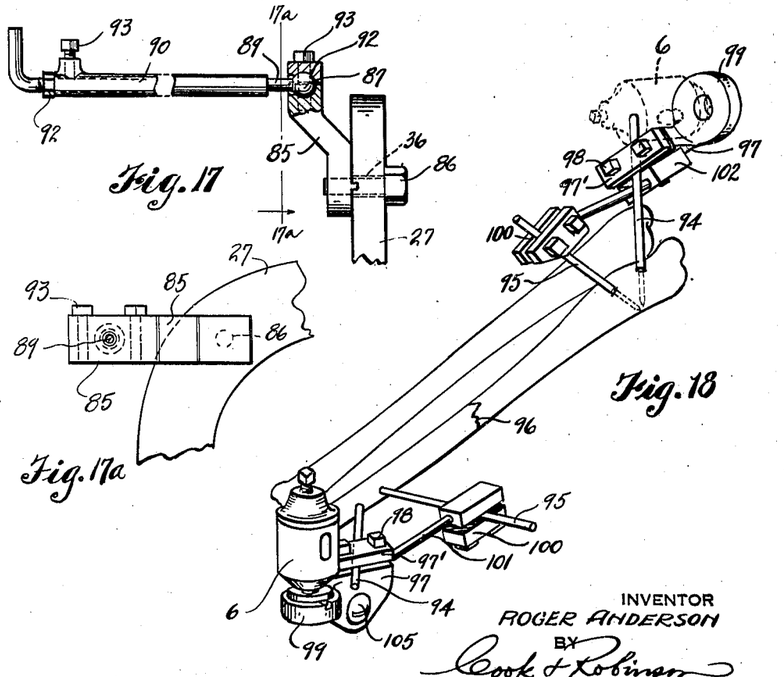
Fig. 17 is a top view of a portion of a connection rod and attachment means of a modified form.
Fig. 17a is a cross section on line 17a—17a in Fig. 17.
Fig. 18 illustrates, in perspective, a means for immobilization of a fracture of the forearm.

In Fig. 17, I have shown an alternative means for mounting the connector rod on a yoke. In this arrangement, there is a lateral bracket or arm 85 fixed to the yoke base by a bolt 86. The bolt is applied through one of the holes 36 in the yoke base provided for the mounting of a swivel clamp as previously described. In the outer end of the bracket is a ball socket 87, containing a ball 88 from which a shank 89 extends. This shank is fixed in the end of a tube 90 in which an extension rod 91 is telescopically contained. The rod 91 may be applied to a swivel clamp 6 and is also threaded for mounting a nut 92 adapted to be tightened against the end of tube 90 for effecting slight extension or elongation as desired for bone lengthening purposes. A set screw 93 is applied to the tube 90 for tightening against rod 91 to hold an adjustment. It is noted in Fig. 17 that the ball 88 may be clamped to hold the parts in rigid connection by means of an overlying cap 92 held by bolts 93.

In Fig. 18 I have shown means for the immobilization of a fractured bone of the forearm. In this instance I apply two short half pins 94 and 95 to each of the fracture fragments at opposite sides of the fracture, indicated at 96. The pins are applied in angular convergence. One pin of each set is secured at its outer end in a clamp comprising a base block 97 and an overlie block 97'. Clamp bolts 98 are extended through holes in the block 97' and are threaded onto the base block. The outer end of the pin is held between the block 97 and block 97' as shown. The block 97 has an integral lug 99 which mounts a swivel clamp 6 thereon. The pin 95 of each set is secured at its outer end in a clamp 100 supported by a rod 101 from the clamp block 97. The rod 101, at its inner end, is secured in a block 102 which is adjustably held on the corresponding block 97 by a clamping screw 105.

The pins 94 and 95 of each set are thus held rigid relative to their respective clamp blocks 97, and with the understanding that each block 97 is provided with the extension lug 99 for mounting a swivel clamp 6 thereon, it will be understood that by applying a connecting rod 8 or 8a to the clamps 6 and the clamps tightened, the fracture may be immobilized.

In Fig. 18, I have shown one of the clamps 6 in full lines and the other in dotted lines, but have omitted the connecting rod to avoid confusion. It is intended, however, that the rod 8 be applied and secured as has previously been explained. With the devices constructed, assembled and applied as herein shown and described, it is apparent that fractures may be immobilized without use of the usual cast and by such means as to leave a wound open or uncovered for easy treatment.

Figure 19:
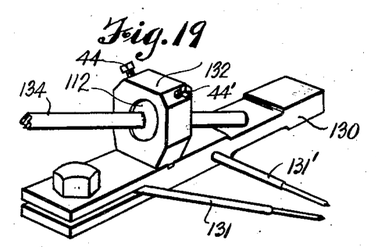
Fig. 19 is a perspective view of a pin mounting bar for lower arm fractures, showing a lug for reception of an extension rod.

In Fig. 19 is illustrated a pin mounting bar to be used in a forearm splint. This comprises the pin mounting bar 130, equipped with small sized half-pins 131—131' for application to the bone fragment as previously described, and on which bar is a lug 132 equipped with swivel ball bearing 112 for reception of extension rod 134; it being understood that half-pins similarly mounted on another bar would be applied to the other bone fragment and the rod 134 likewise adjustably applied thereto. In the use of this splint, the reduction may be mechanically or manually done while the rod is free in its bearings, and then, when the bone fragments are properly located, the splint is rendered rigid by tightening the set screws 44—44' which are mounted on the lug 132 to engage the ball 112.

Figure 20:
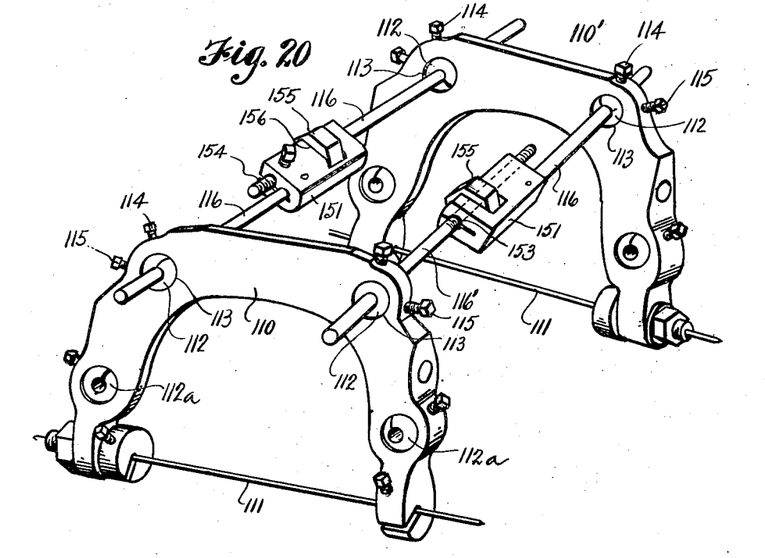
Fig. 20 is a perspective view of a splint especially useful for immobilization of lower leg fractures.

The splint of Fig. 20 is especially applicable to fractures of bones of the lower leg, but not restricted to fractures in this location. It comprises the two yokes 110 and 110', each equipped as described in connection with yoke 27 of Fig. 6 for mounting a transfixion pin, or wire 111, as indicated, for transfixing the fracture fragments. Each yoke is equipped at opposite sides in its base portion with ball bearings 112, pivotally retained in sockets 113 and adapted to be locked in set position by set screws 114—115. Slidably contained in the ball bearings, and extending between the yokes, are extension rods 116—116'.

Now assuming this splint to be so constructed, it is quite apparent that with the transfixions 111 applied to the bone fragments and the yokes applied to the transfixions, and with the rods 116—116' slidable in their bearings 112, the yokes may be mechanically or manually manipulated to bring the ends of the fracture fragments into apposition. Then, by tightening the screws 114—115, the adjustment may be positively retained since all parts will then be rendered rigid.

The yokes 110—110' of this particular splint are equipped also in their leg portions with ball bearings 112a for the mounting of extension arms 71, as illustrated at Fig. 11, for carrying a supplemental transfixion pin when such is advisable.

Figure 21:
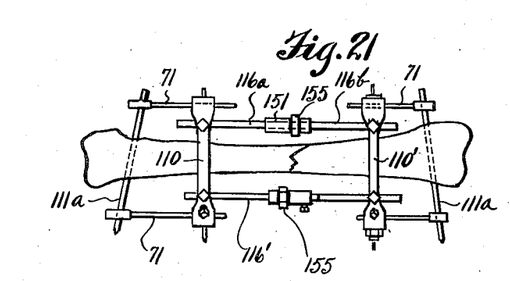
Fig. 21 is a top view of the same, as applied.

Also, the ball bearings 112a may be used for the mounting of extension rods 30 as illustrated in Fig. 6, for the support of another yoke. In Fig. 21, I have illustrated the splint as applied, and as equipped with the extension arms 71 for support of the supplemental transfixions 111a.

In order to better adapt the splint of Fig. 20 to special uses, such for example as for bone lengthening purposes, the connector rods 116—116' are preferably of a construction that permits them to be adjusted in length while applied to the yokes. To permit this adjustment, each rod comprises opposite end portions, which, in Fig. 21, are designated by the reference characters 116a and 116b. One end portion is applied to a bearing 112 in yoke 110 and is fixed at its other end to a block 151. The other portion is applied to a bearing 112 in the yoke 111, and its inner end portion is longitudinally slidable in a hole 153 on the block 151. This latter rod has a threaded end portion contained in the block hole, and a nut 155 is applied thereto and is confined between the opposite side walls of a recess 156 in the block to retain any adjustment in the effective length of the connection that is made by turning the nut.

Figure 22:
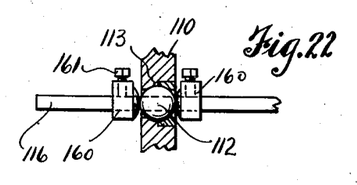
Fig. 22 is a detail of the splint of Fig. 20.

To prevent any possibility of longitudinal slippage of the rods 116—116' in the bearings 112 during a bone lengthening adjustment, or for holding the relationship of the yokes when the screws 114—115' are loosened, I have provided nuts 160 that may be slidably applied to the rods 116—116' to engage opposite sides of the bearings 112, as noted in Fig. 22. These nuts are adapted to be fixed in place by the set screws 161 threaded therethrough to engage the rods 116.

This splint, which I have illustrated in Figs. 20 and 21, is one of the most preferred forms due to its simplicity of construction and use, and its adaptability to mechanical reduction means, and while it is especially applicable to the setting and immobilization of fractures of the lower leg, it manifestly is not restricted to use at this location.

It is preferred that the yoke that is to embrace the superior fragment be somewhat wider than the other so that the splint will better conform to the shape of the limb.

Having thus described my invention, what I claim as new therein and desire to secure by Letters Patent is:

1. An ambulatory fracture reduction and immobilization splint comprising complemental yokes for embracing a limb, at opposite sides of a fracture, transfixions mounted by and extended between the legs of each yoke for transfixing the corresponding bone fragment for reduction of the fracture, by immobilization of the yokes, each yoke having ball sockets formed therein, a split ball bearing rotatably confined in each socket, connector rods extended along the limb between the yokes and slidably passing through corresponding ball bearings therein for adjustment of the yokes therealong for their change in spacing and angular relationship as required for and during reduction of the fracture, and means adapted to be tightened against the said balls to fix them against rotation, and to clamp them on the rods to fix the yokes in their adjustment relative to each other.

2. In a splint of the character described, a transfixion member, a rigid mounting for said member formed with a ball socket, opening therethrough, a ball bearing rotatably confined in said socket and having a rod guide bore therethrough, and formed with a compression slit along one side of the bore, a connector rod slidably contained in said bore and a clamp screw threaded in the mounting, adapted to be tightened against the ball to hold it against rotation in the socket and to compress the ball and clamp the rod against movement therein.

3. A splint of the character described comprising complemental yokes adapted to be applied to a limb at opposite sides of a bone fracture, transfixions applicable through the limb and bone fragments at opposite sides of the fracture and mounted respectively by said yokes for reduction and immobilization of the fracture, each yoke having split ball bearings contained in sockets therein for universal adjustment, a pair of rods extended along the limb and between the yokes and slidable in said ball bearings, and means for clamping the bearings against the rods and the bearings against movement in the yokes in a manner to retain the yokes fixed at any selected position of relative adjustment; each of said rods comprising opposite end sections, applied respectively to the yokes, and a block joining said sections; said block being formed with a longitudinal bore and an open recess through which the bore passes, and one of said rod sections being fixed in the block and the other rod section being slidably contained in the said bore, and a nut threaded on said latter rod section and confined in said recess for adjustment to extend or retract the section to change the yoke spacing.

4. A fracture reduction means, an immobilization splint comprising complemental yokes for embracing the fractured limb at opposite sides of a fracture, a transfixion member extended between the arms of each yoke for transfixing the corresponding bone fragments, each yoke having a ball socket formed therein and a split ball bearing confined in the socket for universal rotary adjustment, a rod extended between the yokes and having opposite end portions passing slidably through the ball bearings of the two yokes and permitting adjustment of the yokes therealong for change in spacing as required for the reduction of the fracture thereby, and set screws in the yoke adapted to be tightened against the ball bearings to fix them against rotation in their sockets and for holding contact with the rods, thus to retain the yokes fixed at any set position of relative adjustment for immobilization of the fracture.

ROGER ANDERSON.